Oct. 29, 1963  G. R. MOORE  3,108,855
REMOVAL OF HYDROGEN SULFIDE FROM GASES
Filed Feb. 2, 1961
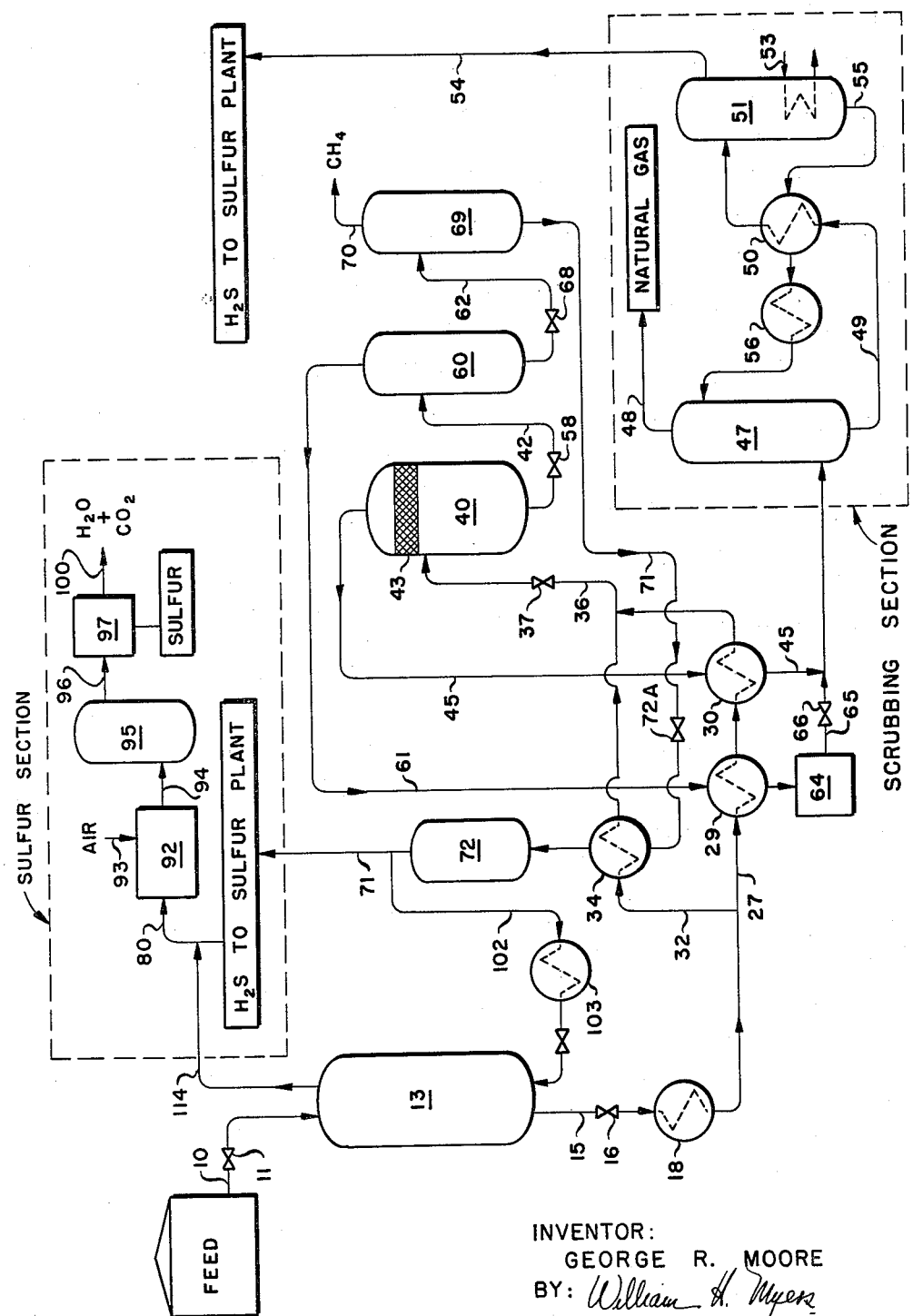
INVENTOR:
GEORGE R. MOORE
BY: William H. Myers
HIS AGENT United States Patent Office 3,108,855
Patented Oct. 29, 1963

3,108,855
REMOVAL OF HYDROGEN SULFIDE FROM GASES
George R. Moore, Oakland, Calif., assignor to Shell Oil Company, New York, N.Y., a corporation of Delaware
Filed Feb. 2, 1961, Ser. No. 86,592
6 Claims. (Cl. 23—181)

This invention relates to the removal of hydrogen sulfide from gaseous hydrocarbons such as, for example, natural gas. One embodiment of the process is its suitability for the recovery of sulfur and a normally gaseous hydrocarbon from a gaseous mixture containing the two materials wherein the sulfur is initially present in the form of hydrogen sulfide.

Many natural gases which contain methane as their major component also contain some acidic gases, i.e., hydrogen sulfide and carbon dioxide, in such large amounts that the separation of these acidic materials must be accomplished before the natural gas can be put to use. Processes are available for the removal of hydrogen sulfide and carbon dioxide from gaseous hydrocarbon streams. Absorption techniques employing solvents usually of a basic character are perhaps the most widely used separation means for the removal of hydrogen sulfide and other acidic components from natural gas and other normally gaseous hydrocarbon streams. These absorption processes (usually liquid phase) are based on the use of a solvent of weakly basic character and having the property of absorbing or reacting with $H_2S$ and liberating it again upon heating. Various absorbing liquids are employed in the available commercial processes for this purpose, including mono- and diethanolamine, sodium phenolate, tripotassium phosphate, and certain water-soluble salts of amino acids. Solid contact materials which are capable of removing $H_2S$ from streams contaminated therewith have found only limited interest and use. Other treatments may involve catalytic decomposition of the hydrogen sulfide, for example, over iron oxide, to convert the hydrogen sulfide to sulfur dioxide or other compounds which may then be removed by absorption or distillation. These various processes, while generally adequate for the removal of hydrogen sulfide when present in small amounts, say less than 6 or 8 mole percent, have not been widely used for the treatment of hydrocarbon streams containing large amounts of the acidic gases.

It is an object of this invention to provide a method for the separating of hydrogen sulfide and other acidic gases from gaseous hydrocarbons. A still further object relates to the recovery of sulfur from a normally gaseous hydrocarbon stream such as natural gas. A still further object is to provide a method for the removal of hydrogen sulfide from natural gases and the like, the streams of which contain a high percentage of hydrogen sulfide. These and various objects and advantages of the invention will become more apparent from the following description taken in conjunction with the accompanying drawing, the single FIGURE of which presents a flow diagram of a preferred embodiment of the process.

In its broad aspects, the process is directed to the separation of a gaseous mixture containing at least one normally gaseous hydrocarbon and more than about 8 mole percent (e.g., 8–90%) of hydrogen sulfide. The gaseous mixture is cooled while under a pressure in excess of 700 p.s.i.a. to a temperature in the range of −10 to about −80° F. In effecting this temperature reduction, the potential pressure drop is an important consideration and its exact determination will depend on the particular reduction in temperature desired as well as on the composition of the stream involved. For example, in a preferred embodiment of the invention the cooling may take place substantially isobarically. This means that the pressure is not rigidly conformed to a constant pressure system, but may vary within limits so that in perspective the cooling is produced in a substantially isobaric environment. However, it will be readily apparent to those skilled in the art that minor, and sometimes even pronounced, pressure changes may be advantageously employed in producing the desired temperature drop. Such pressure changes can be effected and controlled by means of valves and, in particular, in accordance with the system as described hereinafter.

In the situation wherein the mixture is cooled substantially isobarically as already set forth, the cooled mixture (including any liquid phase in addition to a gaseous phase) is expanded, substantially adiabatically, to further lower the temperature thereof by at least 10° F. to within the range of −20 to −100° F. to produce a mixture of a vapor phase and a single liquid phase. The expanded mixture is separated into a liquid comprising hydrogen sulfide containing a small amount of the hydrocarbon and a gaseous hydrocarbon phase containing a significantly reduced amount of the hydrogen sulfide. The pressure on the separated liquid hydrogen sulfide phase is then reduced further, substantially adiabatically, to bring about evaporation of dissolved hydrocarbon therefrom (optionally warming the liquid phase sufficiently by heat exchange to effect vaporization of methane and any associated alkanes such as ethane), thus lowering still further the hydrocarbon content of the liquid hydrogen sulfide and effectively concentrating the latter material still in liquid phase. This cold liquid hydrogen sulfide phase and the two gaseous hydrocarbon streams are used separately to provide the major cooling of the gaseous mixture feed to the process. The separated gaseous hydrocarbon is then treated with a selective solvent to minimize its hydrogen sulfide content. In a preferred embodiment of the process, the hydrocarbon evaporated from the liquid hydrogen sulfide phase is removed therefrom in two stages of pressure reduction. The hydrocarbon evaporated in these two pressure reductions of the hydrogen sulfide liquid phase is treated along with the major stream of the gaseous hydrocarbon removed earlier in the process with a selective solvent to remove the remainder of the hydrogen sulfide. Carbon dioxide, if present in the feed, will generally accompany the hydrogen sulfide throughout the several steps of the process.

In order to avoid any possible difficulty with hydrate formation, it is recommended that the stream being treated be first dehydrated to lower its dew point to below 0° F. and preferably below −50° F., i.e. to a water content lower than about 2 p.p.m. The most efficient operation of the process is had by expanding the cooler mixture initially to a pressure in excess of 200 p.s.i.a., i.e., the major gaseous hydrocarbon stream should be at a pressure in excess of 200 p.s.i.a. when delivered to the amine or other selective solvent plant to complete its hydrogen sulfide removal. The hydrogen sulfide separated from the feed may be subjected to a partial oxidation, as in the Claus process with a bauxite catalyst for recovery of its sulfur content as elemental sulfur.

Various liquid solvent extraction processes may be employed for the clean-up of hydrogen sulfide from the gas separated in the low-pressure flashing operation. These solvents are either weakly basic in character or act as physical selective solvents and have the property of taking up hydrogen sulfide at low temperatures, usually under elevated pressures. The $H_2S$ extracted by the solvent may then be liberated on heating. The materials generally considered satisfactory for the $H_2S$ absorption have already been enumerated, with some preference for the amines and, in particular, alkanolamines such as diethanolamine or diisopropanolamine, as well as amides, such as di-N-alkylamides of short chain fatty acids, glycols, or tetramethylene sulfones and mixtures thereof. Sulfolane, dimethyl sulfoxide, and N,N-dimethylformamide are typical examples.

In a particular embodiment of the process, raw natural gas, usually at a gathering system pressure of at least 1000 p.s.i.a. and a temperature of about 90° F. (50–120° F.) is passed through an absorption bed, such as silica gel to reduce its water content to a dew point preferably less than −50° F. From this pre-drying operation, the natural gas may be passed to a water-cooled heat exchanger where its temperature is lowered some 10 to 20° F. The water-cooled natural gas stream may then be split and, in any event, is cooled by the separated products of the process to a substantially lower temperature of approximately −53° F. and a pressure 20–500 p.s.i.a. below the feed pressure, say, 920 p.s.i.a. The natural gas and condensed liquid mixture is then expanded in a first stage flash to a pressure of 200–600 p.s.i.a. below the feed pressure, say, 575 p.s.i.a and a temperature of about −80° F., while maintaining a gaseous hydrocarbon phase and a single $H_2S$-rich liquid phase. Liquid hydrogen sulfide is separated from the gaseous hydrocarbon, principally methane, in a suitable vapor-liquid separator with the hydrocarbon being removed overhead, passed in heat exchange with the incoming natural gas or a portion of it, and then delivered to a scrubbing plant to complete the removal of hydrogen sulfide therefrom. Monoethanolamine is generally used for this latter operation, although other solvents such as dimethylformamide or diisopropanolamine may be used.

The liquid hydrogen sulfide from the liquid-vapor separator is expanded sufficiently to vaporize hydrocarbons, e.g., to 200 p.s.i. (from 575 p.s.i.a.), effecting adiabatic cooling to a temperature of about −90° F. and still maintaining a single liquid $H_2S$ phase. The gas-liquid mixture from this second stage flash is passed to a second liquid-vapor separator where the methane vapors are taken overhead. The methane vapors from the second stage flash separator are preferably recompressed and passed with the gaseous hydrocarbon removed in the first stage flash, to the aforementioned amine (or other selective solvent) plant. The liquid hydrogen sulfide out of this second stage flash separator is preferably subjected to another pressure reduction (third stage flash), this time to about 75 p.s.i.a. (50–100 p.s.i.a.), giving a temperature of around −93° F. (−20 to −110° F.). The hydrogen sulfide from the third stage flash separator is passed to the Claus plant and the methane recovered overhead is recompressed and added to vapors from the first stage flash.

The practice of the invention will be described in greater detail with reference to the drawing and the processing of a raw natural gas containing, for example, 55% methane, 35% $H_2S$, 10% $CO_2$ and saturated with water vapor, at approximately 1000 p.s.i.a. pressure and 90° F. The gas is passed via line 10 through open valve 11 to a silica gel dehydration unit 13. The silica gel desiccant has a relatively coarse mesh (5–20 mesh) and is capable of drying the feed. The feed is dried to a water dew point below approximately −50° F., preferably below about −65° F., containing no more than about 1 p.p.m. water or 0.01 lb. $H_2O$/million s.c.f., thus guarding against later $H_2S$-hydrate formation in the low-temperature portions of the process. The dried gas leaves the silica gel bed in a line 15 and passes through an open valve 16 to a cooler 18.

The water cooler lower the temperature of the raw natural gas to about 70° F. Beyond the water cooler, the natural gas is divided into two streams, with a secondary portion thereof being passed in a line 27 through a first heat exchanger 29 which lowers its temperature to say about 61° F., and then through another heat exchanger 30 which lowers its temperature much further to about −53° F., with second and first subsequently separated hydrocarbon streams being used as cooling media, respectively. At this point the natural gas will have a pressure of around 920 p.s.i.a. The primary portion of the natural gas flowing from water cooler 18 is passed through a branch line 32 to a heat exchanger 34 where it is cooled by heat exchange against subsequently separated vaporized hydrogen sulfide, to a temperature of about −53° F. Pressure of the stream is about 920 p.s.i.a. The two streams are proportioned in accordance with the composition thereof and the separation to be effected and the requirements imposed by the subsequent processing of the separated hydrocarbon and hydrogen sulfide components and their resulting refrigeration capacities for cooling the respective proportions of the feed stream.

The primary and secondary streams of the natural gas carried by the lines 32 and 27, respectively, are recombined and passed via line 36 through a throttling valve 37 to a first stage flash separator 40. The pressure reduction on the natural gas as it passes through the throttling valve is controlled to lower the temperature to no lower than about −80° F. and a pressure of about 575 p.s.i.a., to give a vapor-liquid two-phase system. In the first stage flash separator, a single liquid phase condensate rich in $H_2S$ and $CO_2$ and containing a minor amount of $CH_4$ collects at the bottom and is removed in an exit line 42. Vapor within the first stage flash separator, principally $CH_4$ along with a minor amount of $H_2S$, for example, 4.6 mole percent and 4.0 mole percent of $CO_2$, is removed through a liquid-vapor screen separator 43 and a line 45.

The flashed methane vapor being at the low temperature of approximately −80° F., is used, without substantial pressure reduction, as the coolant in the last heat exchanger 30 to cool the portion of the natural gas feed in line 27 to about −53° F. The methane coolant vapors out of the heat exchanger 30 continue in line 45 to an amine plant with substantially the remainder of the acid gases being thereby removed by absorption under substantial superatmospheric pressure.

The sour gas enters the base of an absorber 47 where it passes in countercurrent flow upwardly through the heat exchange against a downwardly descending aqueous solution of diisopropanolamine. The sour gas enters at a temperature of about 20–80° F. A stream of natural gas containing substantially no $H_2S$ nor $CO_2$ is removed from the top of the absorber in a line 48. The rich solution made up of the aqueous diisopropanolamine and extracted $CO_2$ and $H_2S$ leaves the base of the absorber in a line 49, passes through a heat exchanger 50 and is introduced to an upper portion of a stripper 51. The heat required for the operation of the stripper is provided through a reboiler 53 heated by steam. The stripped acid gases leave overhead from the stripping vessel in a line 54. The hot, lean solution is removed from the bottom of the stripper 51 and passed by line 55 to the heat exchanger 50 where its temperature is dropped considerably and from there passed to a water cooler 56 which lowers its temperature to say about 80° F. in preparation for introduction to the absorber.

The liquid condensate of the first stage flash separator 40 passes via line 42 to an expansion valve 58 where pressure is reduced on the liquid to about 200 p.s.i.a., resulting in a temperature drop to about −90° F. The stream is introduced to a second stage flash separator 60 where vaporized methane is removed overhead in a line 61 and the acid gas condensate is removed via line 62 from the base of the separator. The methane vapor which is at a pressure of approximately 200 p.s.i.a. is moved to the line 61 through heat exchanger 29 to the inlet side of a gas compressor 64 where it is compressed to a pressure of say 560 p.s.i.a. and then introduced via a line 65 and a valve 66 to the dry sour gas stream of line 45 previously removed from the first stage flash separator 40. The combined natural gas stream passes as already described hereinbefore to the amine plant for the removal of the last of the acid gases.

The acid gas condensate from the second stage flash separator will still contain a small amount of methane and in order to still further reduce the methane content, the condensate carried by the line 62 is expanded through a valve 68 to a pressure of about 75 p.s.i.a. and a temperature of −93° F. and then introduced to a third stage flash separator 69. The methane-enriched stream is removed overhead from this latter separator in a line 70. The acid gas condensate which now has a very low methane content of say around 1% is taken from the base of the third stage flash separator 69 via line 71 through valve 72A on its way to a Claus plant for conversion of the $H_2S$ to elemental sulfur.

The liquid acid gas condensate in line 71, being at a temperature of say −93° F., has a large cooling capacity which is employed to lower the temperature of the natural gas feed out of the silica gel desiccant en route to the first stage flash separator. The acid gas condensate of line 71 is passed to the before-described heat exchanger 34 where it is employed to cool a portion of the natural gas feed. In serving as a coolant in heat exchanger 34, the $H_2S$ condensate is gasified to a pressure of approximately 35 p.s.i.a. and a temperature of about −49° F.

In the particular embodiment illustrated in the accompanying drawing the acid gases are next passed to a "sponge oil" (gas oil or lubricating oil) absorption column 72. The purpose of the passage of the acid gases through the absorption column is to remove therefrom, or at least to substantially reduce, their hydrocarbon content. Hydrocarbons, particularly those having at least four carbon atoms per molecule, interfere with the operation of a Claus plant and are hence desirably removed. However in some operations it will be understood that an absorption column may not be required. The acid gas containing a reduced amount of hydrocarbons is removed from the column via the main line 80.

The acid gas via line 80 is directed to a conversion zone 92 to effect therein a partial combustion of the $H_2S$ to $SO_2$ and in some cases a partial conversion to elemental sulfur. A stream of air is supplied to the zone via line 93. The effluent from the conversion zone made up of $H_2S$, elemental sulfur, $SO_2$, water and carbon dioxide is passed through line 92 to a bauxite catalyst zone 95 where the $SO_2$ is further reacted with $H_2S$ to produce elemental sulfur. Conversion to sulfur is about 93%, based on the hydrogen sulfide charge. The effluent from this latter zone passes in a line 96 to a condenser 97 where the sulfur is condensed and removed via line 98. Water and carbon dioxide leave the zone in a line 100.

A slip stream of the methane-stripped acid gas in line 71, which is very low in water content, is taken via line 102 from the conversion zone feed for the purpose of regenerating the silica gel beds. This slip stream of acid gas which will be at about 80° F. is passed to a heat exchanger 103 where its temperature is elevated to say about 470° F. The effluent from the Claus converter 95, being at about 800° F., may be conveniently employed to supply any heat needed for heat exchanger 103 leading to the silica gel bed 13. The acid gas regenerating stream with its water vapor load leaves bed 13 via line 114 into the acid gas line 80.

This application is a continuation-in-part of application Serial Number 70,158, filed November 18, 1960, now abandoned.

I claim as my invention:

1. A process for separate recovery of gaseous hydrocarbons and hydrogen sulfide from a gaseous mixture comprising normally gaseous hydrocarbons containing at least 8 mole percent hydrogen sulfide comprising:
    (a) substantially dehydrating the mixture;
    (b) cooling the mixture as two separate streams by indirect heat exchange with the separate coolants of step (e) while under a pressure in excess of 700 p.s.i.a. to a temperature in the range of −10° F. to −80° F. and thereafter combining the two streams;
    (c) expanding the cooled mixture to obtain a single liquid hydrogen sulfide phase and a gaseous hydrocarbon phase having a temperature in the range of −20° F. to −100° F., the liquid phase containing a small amount of hydrocarbon and the gaseous phase containing a significantly reduced amount of hydrogen sulfide, and separating the vapor and liquid phases;
    (d) further reducing the pressure on the separated liquid hydrogen sulfide phase to evaporate hydrocarbon therefrom, thereby reducing its hydrocarbon content;
    (e) employing the separated hydrogen sulfide and hydrocarbon as produced hereinbefore as separate coolants in step (b) for the two gaseous mixture streams; and
    (f) treating the separated gaseous hydrocarbon phase under substantially superatmospheric pressure with a selective solvent for hydrogen sulfide to produce a hydrocarbon stream substantially free from hydrogen sulfide.

2. A process in accordance with claim 1 wherein the removal of the hydrocarbon from the liquid sulfide phase is accomplished in two pressure reductions and wherein the hydrocarbon evaporated in the first of said two pressure reductions is treated by the selective solvent of step (e) along with the gaseous hydrocarbon phase of step (b).

3. A process in accordance with claim 1 wherein the gaseous mixture being treated also contains carbon dioxide and wherein the carbon dioxide accompanies the hydrogen sulfide throughout the several steps of the process.

4. A process in accordance with claim 1 wherein at least a portion of the hydrocarbon removed from the liquid hydrogen sulfide through pressure reduction is compressed, combined with the gaseous hydrocarbon phase of step (b) and then treated in step (e) with the selective solvent.

5. A process according to claim 1 wherein the dehydration of the feed mixture is effected by passage of the mixture through a silica gel bed, the water absorption capacity of the bed being periodically removed by periodically blowing the bed with hydrogen sulfide recovered from step (d) at a temperature above the boiling point of water.

6. A process for the recovery of hydrogen sulfide and normally gaseous hydrocarbons from a gaseous mixture containing the hydrocarbons and at least 8 mol percent of hydrogen sulfide, said gaseous mixture being further characterized by having a water dew point below 0° F., the steps comprising:
    (a) cooling the gaseous mixture while under a pressure in excess of 700 p.s.i.a. to a temperature in the range of −10° F. to −80° F.;
    (b) expanding the cooled mixture to obtain a mixture having a temperature in the range of −20° F. to −100° F. and separating the expanded mixture into a liquid hydrogen sulfide phase containing a small amount of the hydrocarbon and a gaseous hydrocarbon phase containing a significantly reduced amount of the hydrogen sulfide;
    (c) further reducing the pressure on the liquid hydrogen sulfide phase to evaporate hydrocarbon therefrom, thereby reducing its hydrocarbon content;
    (d) separately employing the hydrogen sulfide and gaseous hydrocarbon phases obtained from step (b) to effect the major portion of the cooling of step (a) by indirect heat exchange;

(e) treating the gaseous hydrocarbon phase formed in step (b) with a selective solvent for hydrogen sulfide and recovering a gaseous hydrocarbon raffinate substantially free of hydrogen sulfide and a fat solvent phase enriched in hydrogen sulfide; and (f) heating the fat solvent to liberate the hydrogen sulfide therefrom, whereby substantially hydrogen sulfide-free hydrocarbon and hydrocarbon-free hydrogen sulfide are separated.

References Cited in the file of this patent

UNITED STATES PATENTS

| Re. 18,563 | Cooper et al. | Aug. 9, 1932 |
| Re. 19,531 | Benner et al. | Apr. 16, 1935 |
| 1,854,770 | Sperr | Apr. 19, 1932 |
| 2,251,216 | Woodhouse | July 29, 1941 |
| 2,901,326 | Kurata et al. | Aug. 25, 1959 |